2,994,601
Patented Aug. 1, 1961

2,994,601
NICKEL RECOVERY FROM ORE
Albert E. Greene, P.O. Box 71, Medina, Wash.
No Drawing. Filed Feb. 3, 1958, Ser. No. 712,613
7 Claims. (Cl. 75—31)

This invention relates to non-fusion reduction of metal oxide ore, especially in rotary furnaces and particularly to the reduction of nickel and iron oxide in such ores to recover the nickel as a dense nickel-iron alloy metal having a high enough percent of nickel to permit formation of dense nickel-iron particles having a high resistance to oxidation compared with sponge iron.

The disadvantage of rotary kiln furnace partial reduction of iron ore to sponge iron is well known, namely incomplete reduction of iron ore even with great excess of carbon. The present invention contemplates purposely holding back the reduction of iron oxide of a nickel and iron oxide ore but reducing practically all of the nickel, utilizing a rotary furnace heated by combustion in this process. The invention further contemplates holding back reduction of iron by limiting the amount of solid carbon, and also by use of a holding oxide for combination with the iron oxide, or by use of gas which holds back reduction of iron oxide while reducing nickel oxide.

In one modification of the invention in a two-furnace combination preheating of the ore to the desired extent is accomplished in one rotary furnace and final reduction is accomplished in a second rotary furnace. This combination makes possible determining the amount of solid carbon in the discharge from the first rotary furnace and adjusting the carbon proportion in the second rotary furnace. In another modification of the invention, heating of the charge in the second or reducing rotary furnace can be accomplished by admission of hot or super-heated hot reducing gas into the discharge end of the second rotary furnace, aiding in the selective reduction of nickel while holding back reduction of iron oxide by control of reducing and oxidizing components of the gas.

This present application is a continuation in part of my application Serial No. 702,259 filed Dec. 12, 1957, and of my copending application Serial No. 670,361, filed July 8, 1957.

Nickel occurs in small percentages in oxide ores with iron along with usually much higher percentages of iron. In reduction of most of both metals as they occur in the ore, the nickel is usually very low in percentage in proportion to iron.

Use of nickel and iron alloy metal containing less than a certain percent of nickel as an addition to a charge or heat of steel will not keep the nickel from being lessened undesirably on the addition of the ferrochrome to give a high chromium nickel steel. It is desirable, therefore, to produce a nickel and iron alloy metal with preferably more than 20% of nickel to permit retaining at least 8% of nickel after addition of the ferrochromium. Furthermore, when the iron ore is high in iron but quite low in nickel, and the product is a sponge iron, for example a sponge iron containing as little as 2% nickel, and about 20% of the total iron content as oxide, the advantage of a dense nickel-iron alloy metal with high oxidation resistance is lost. A purpose of the present invention is to recover the nickel in a dense particle more difficult to oxidize than iron.

Reduction of iron ore in a combustion heated rotary kiln type furnace to sponge iron is known to be inefficient in recovery of the iron. Efforts to reduce nickel in a sponge iron product as disclosed in the patent to Kichline, No. 1,717,160 have not been successful. The ore contained over 50% of iron and less than 1% of nickel, and altho a large excess of coal was used in the rotary kiln, only about 68% of the iron was reduced to sponge iron with 15% of the weight of the ore as coal; and when the proportion of coal was further increased, namely to 25%, then only 80% of the iron was reduced, and the sponge iron had only 2% of nickel in it. The product made was sponge iron. The product of the present invention is not sponge iron but is a dense and much higher nickel-content iron alloy having much higher oxidation resistance than sponge iron.

In another patent, namely that to Oppegaard, No. 2,603,532, the difficulty of high recovery of iron in a sponge-iron process is disclosed with the statement that not more than 50 to 80 percent of the total iron is ordinarily accomplished.

In the present invention, instead of using large or increased percentages of coal or carbon, very much less carbon is used, and the nickel-iron particles recovered are not sponge iron or like sponge iron, but they are dense metal particles having high resistance to oxidation, and recovery of the nickel is efficient.

A better understanding of the invention may be had by considering the high temperature chemistry involved. At temperatures between about 1400 deg. F., or where reduction of nickel oxide begins, and up to and above the fusion temperatures of the ore and nickel, nickel oxide can be reduced by iron in an atmosphere nonoxidizing to nickel. The reaction is believed to be as follows: Fe plus NiO yields Ni plus FeO. Iron oxide as FeO within the above temperature range does not oxidize nickel, so that reduced nickel or nickel iron can exist along with FeO. This applicant has produced nickel-iron pellets containing over 40% of nickel held in a mass of black iron oxide material with no apparent evidence of oxidation of the nickel, and the shiny appearance of the dense nickel-iron alloy metal pellets was in marked contrast with the black iron oxide.

It is also known that $CO—CO_2$ gas can reduce nickel oxide but hold back reduction of iron oxide, using a CO to $CO_2$ ratio of about 1½ to 1; and when the $CO_2$ is further increased to a gas having about a 1 to 1 ratio, the reduction of FeO is practically none. Thus, if the CO gas is partly oxidized to $CO_2$ so that the resultant gas contains as much $CO_2$ as CO (that is, having a ratio of about 1 to 1 for CO to $CO_2$), heat is produced and nickel is reduced but the FeO need not and won't be reduced to metallic iron (Fe).

Then, the use of a holding oxide, such as $SiO_2$ will serve to hold back the reduction of iron oxide. However, the affinities of nickel and iron for oxygen are relatively close together, so that in the presence of solid carbon, both can be reduced unless reduction of iron oxide to metal is held back. Thus, limiting the proportion of carbon holds back reduction of iron oxide to metallic iron, and if an amount of carbon is used to reduce all of the nickel but 3 to 5 times as much iron, the nickel-iron alloy would be in the range from about 25% nickel to 15% nickel.

An important result of this invention is that in a high nickel content alloy with iron in the dense metal particles formed by this invention such as a 20% nickel content alloy, the presence of the higher percent of nickel makes the alloy much more resistant to oxidation than is a sponge iron without nickel.

*Example 1*

An example of a process embodying this invention follows. The ore may contain 0.8% of nickel and about 6% of iron. In order to recover a 20 to 25 percent nickel iron when all the nickel is reduced and enough iron to come within that range, more than 3% of carbon would serve. However, much of the small amount of carbon to recover a 20% nickel content iron alloy may be lost in the combustion heating prior to reduction. Using a single continuous rotary type of furnace heated by combustion of fuel oil or gas, sample discharge holes along the length of the kiln can serve to obtain samples for analysis to determine the remaining carbon. Solid carbon mixed with the charge, for example 3% or even 4%, should permit recovery of the dense nickel-iron alloy metal after the charge reaches the reducing temperature. Both nickel and iron are reduced near the discharge end. The temperature of the charge should be kept below the sticky temperature causing stoppage of charge movement by sticking or fusion, and a temperature of about 1600° F. will reduce the nickel. No reoxidation of nickel occurs if insufficient oxygen is present. The nature of the dense nickel-iron particles with over 20% nickel is such that they are more difficult to oxidize than iron not containing nickel. The ore charge is preferably 10 mesh or smaller. If gas from a special producer is used, it can be superheated before it is admitted into the discharge end of the reducing rotary furnace. After discharge of the dense nickel-iron alloy particles they can be separated from the unreduced material, and can, if desired, be subsequently melted to produce uniform composition. The sticking together of particles of dense metal and unreduced material does not cause stoppage of movement of the charge.

*Example 2*

The process of the invention can be carried out in a two-furnace combination, such as in two rotary furnaces, the first for preheating primarily, altho low temperature reduction can occur; and the second rotary furnace for completion of reduction. The discharge from the first rotary furnace is admitted into the second furnace. Heating of the first rotary furnace can be by combustion of the hot gas from the second furnace. Heating of the second rotary furnace is by preferably hot, superheated gas which can be made in a gas producer using air or oxygen to make a high-percent CO gas. Superheating can be accomplished, by partial combustion or by electric heating before admission of gas into the second furnace. One purpose of using two furnaces is to obtain efficient and fast preheating in the first furnace. Use of carbonaceous material in the charge entering the first rotary can assist in the preheating, but since the draft may be high, some carbon is lost and some oxidized. Presence of carbon in the discharge from the first furnace is important to know and this can be determined from samples of the first furnace discharge and then adjustment of carbon made with the charge entering the reducing rotary furnace. Since reduction of nickel can be largely accomplished by reaction between the solid carbon and the nickel oxide and then the iron oxide, even the CO and $CO_2$ gas is the product of such reaction, the amount of hot or superheated reducing gas, entering the second rotary furnace, need not accomplish so much reduction and therefore the draft thru the second rotary furnace need not be high. But when the hot reducing gas from the second rotary furnace enters the preheater rotary furnace, then a higher draft may be required to accomplish the desired preheating. Thus a purpose of the two rotary furnace combination is to accomplish rapid preheating first, regardless of loss of carbon there, and to accomplish the desired fast reduction in the second rotary furnace after the charge has first been preheated. A purpose in the second rotary furnace is to accomplish fast reaction at the higher temperature there and a shorter second rotary furnace can serve. Movement of material thru both furnaces is continuous preferably. The process can be carried out in batch charges.

The reducing gas should have at least 1½ times as much CO as $CO_2$ for reduction of nickel while holding back reduction of iron oxide, and more $CO_2$ would further hold back reduction of iron oxide. To obtain higher $CO_2$ a shallower depth of bed of coal in the producer is needed. Also it is preferable to avoid use of steam to cool the gas from the producer and have hotter gas entering the rotary furnace. Superheating of gas by an electric arc or other means is possible.

The refractory lining, especially of the higher temperature or second rotary furnace, is preferably basic where high MgO is in the ore.

Use of additional silica to combine with the iron oxide can be used as well as control of gas composition to hold back reduction of oxide of iron.

The process is not limited to nickel and iron oxide ore containing only relatively low percentages of iron.

In the used of two rotary furnaces, use of electric arc heating in the second rotary furnace can, of course, be used, as disclosed in my prior application Ser. No. 702,259 and my application Ser. No. 670,361 filed July 8, 1957.

The process can be used for other metal oxide material, such as iron oxide concentrates or ore; and the process is preferably a continuous process. The expression "ferrous metal oxide ore" or material, as used in this specification is intended to mean an ore or material containing iron oxide, such as iron ore, or and ore containing iron and another metal such as nickel as oxide; but the expression which includes the word "ferrous" is not intended to mean the lowest stage of oxidation of iron, such as FeO, or to have reference to such stage.

An important advantage of this invention is the recovery of an alloy iron more difficultly oxidizable than ordinary iron, thus greatly simplifying recovery and avoidance of reoxidation.

What I claim is:

1. The process of treating nickel and oxide iron ores containing from less than 1% of nickel and several percent of iron up to several percent of nickel and much larger percents of iron; said process consisting in preparing small particle charge of the ore, preheating this in a combustion heated furnace up to the temperature of reduction of the nickel oxide; discharging the hot preheated mix into another furnace and there heating it together with reducing material in sufficient proportion to reduce all of the nickel oxide but not more than four times as much iron, reducing nickel and iron oxides and forming dense metal particles, and discharging and cooling the reduced nickel-iron particles.

2. The process of claim 1 wherein solid small particle size carbon material is admitted with the charge into the combustion heated furnace; determining the approximate percent of carbon remaining in the discharged preheated product from the combustion heated furnace and adding additional carbon required for reduction of the nickel along with the preheated product into the second furnace.

3. The process of claim 1 in which the second furnace is a rotary furnace heated by means other than combustion.

4. The process of reducing nickel and iron oxide ore, said process consisting in preparing charge of small particle size ore and solid carbon material, the latter sufficient to reduce all of the nickel but only enough iron to yield under the conditions maintained the desired nickel content iron alloy metal; providing reducing gas and admitting this into a rotary furnace in which the charge particles move, burning the reducing gas and heating the charge there to reducing temperature without causing stoppage by sticking of the charge reducing the nickel and iron oxides and forming dense metal particles and without reoxidizing the reduced nickel discharging these dense metal particles and accompanying material and separating and collecting the nickel-iron particles.

5. The process of reducing nickel and iron oxide ore which process consists in preparing charge of small particle size ore and solid carbonaceous material, the latter in amount sufficient to reduce all the nickel but only sufficient iron to yield the desired proportion of iron to permit higher resistance to oxidation than sponge iron has in the nickel-iron alloy metal particles in the order of about 20% nickel; admitting such charge into a rotary furnace and heating it therein by combustion to a temperature sufficient to reduce the nickel and some iron; but not hot enough to cause stoppage by sticking of the charge; reducing the nickel and iron oxides and forming dense metal particles of nickel-iron having higher resistance to oxidation than sponge iron has and holding back reduction of iron beyond that resulting from limitation of the solid carbon proportion in the charge, by maintaining atmosphere reducing to nickel oxide but not to iron oxide (FeO) and discharging these particles along with unreduced material and separating and collecting the nickel-iron particles.

6. The process of reducing nickel and iron oxide ore containing a small percentage of nickel and at least several times that much iron; said process consisting in preparing small particle charge of the ore and solid carbonaceous material, the latter in amount sufficient to reduce all of the nickel but only the desired proportion of the iron; admitting such charge into a preheating furnace and heating it therein by combustion to the temperature at which reduction of nickel takes place; then discharging the preheated material into a second furnace, admitting additional carbon with the charge in the second furnace; heating the charge in the second furnace to reducing temperature but without causing stoppage by sticking and reducing the nickel and iron oxides and forming dense metal particles without reoxidizing the reduced nickel by maintaining the atmosphere reducing to nickel but holding back and limiting reduction of FeO to Fe, and after discharging the product from the second furnace, separating and collecting the nickel iron particle.

7. The process of reducing nickel and iron oxide ore, said process consisting in preparing charge of small particle size ore and solid carbon material, the latter sufficient to reduce all of the nickel but only enough iron to yield dense nickel-iron alloy metal particles, preparing hot reducing gas containing CO and admitting this into the discharge end of a rotary furnace into and through which the prepared charge passes, burning the CO containing gas and heating the charge there to reducing temperature but without stoppage by sticking of the ore, reducing the nickel and iron oxides and forming dense metal particles containing more than 20% nickel; discharging these and the accompanying unreduced material and separating and collecting the nickel-iron particles.

References Cited in the file of this patent

UNITED STATES PATENTS

| | | |
|---|---|---|
| 1,403,576 | Stanfield | Jan. 17, 1922 |
| 2,523,138 | Oppegaard | Sept. 19, 1950 |
| 2,684,296 | Moklebust | July 20, 1954 |
| 2,767,075 | Greene | Oct. 16, 1956 |